US00RE34231E

United States Patent [19]

Anderson, Jr.

[11] E Patent Number: Re. 34,231

[45] Reissued Date of Patent: Apr. 27, 1993

[54] REFRIGERATION CLEANING AND FLUSHING SYSTEM

[76] Inventor: David W. Anderson, Jr., 214 Sandra Rd., Jacksonville, Fla. 32211

[21] Appl. No.: 591,770

[22] Filed: Oct. 2, 1990

Related U.S. Patent Documents

Reissue of:

[64] Patent No.: 4,887,435
Issued: Dec. 19, 1989
Appl. No.: 210,087
Filed: Jun. 23, 1988

[51] Int. Cl.[5] ..... F25B 47/00

[52] U.S. Cl. ..... 62/85; 62/292; 62/475; 62/149; 62/303; 62/298

[58] Field of Search ..... 62/77, 85, 149, 195, 62/292, 529, 303, 474, 475, 298, 299

[56] References Cited

U.S. PATENT DOCUMENTS 3,091,945 6/1963 Morse .
3,592,017 7/1971 Lipman et al. .
3,699,781 10/1972 Taylor .
4,169,356 10/1979 Kingham .
4,267,705 5/1981 Leonard et al. .
4,285,206 8/1981 Koser .
4,441,330 4/1984 Lower et al. .
4,476,688 10/1984 Goddard .
4,646,527 3/1987 Taylor .
4,717,406 1/1988 Giacobbe .

*Primary Examiner*—John Sollecito
*Attorney, Agent, or Firm*—Birch, Stewart, Kolasch & Birch

[57] ABSTRACT

A portable refrigeration system and process for flushing and cleaning an installed refrigeration system including disconnecting the compressor from the installed system and connecting the disconnected lines to a portable refrigeration system including a compressor, a condenser, a receiver, an evaporator, a filter, and a dehydrator so as to form a closed circuit of the installed system and the portable system; operating the portable system to flush refrigerant through the installed system alternately as a liquid and as a gas, and alternately in the normal and reverse directions of flow; passing the flushing refrigerant through a filter for removing particulate matter and through a dehydrator for removing aqueous contaminants; and returning the installed system to its separate operating circuit when all parts and when the refrigerant is judged to be cleaned.

31 Claims, 1 Drawing Sheet

REFRIGERATION CLEANING AND FLUSHING SYSTEM

Matter enclosed in heavy brackets [ ] appears in the original patent but forms no part of this reissue specification; matter printed in italics indicates the additions made by reissue.

BACKGROUND OF THE INVENTION

Refrigeration and air conditioning systems employing a vaporizable fluorocarbon liquid as the refrigerant have become the standard for most of the civilized world. Periodically, such systems need to be cleaned out to remove moisture, dirt, acidic materials, metal dust, etc. from the system's mechanical components and from the refrigerant itself. In earlier times it was routine to blow off the refrigerant to the atmosphere, clean out the components and reassemble the system with new replacement refrigerant. Since the discovery that fluorocarbon vapors are helping to destroy the protective ozone layer in our outer atmosphere there have been major efforts to prevent loss of fluorocarbons to the atmosphere. Refrigeration systems are now cleaned by removing and storing the refrigerant, cleaning the apparatus and the refrigerant separately, and then reassembling the system and cleaned refrigerant for further service.

The prior art, exemplified by U.S. Pat. Nos. 3,592,017 to Lipman; 3,699,781 to Taylor; 4,169,356 to Kingham; 4,267,705 to Leonard et al.; 4,285,206 to Koser; 4,441,330 to Lower et al.; and 4,646,527 to Taylor, describes apparatus and processes whereby the fluorocarbon refrigerant (Freon) is removed from a system and purified by the use of filters, driers, deacidifiers, noncondensible gas removers, and the like, and subsequently returned to the apparatus for continued operation. While such procedures may be satisfactory, they are time consuming and they provide opportunities for accidental refrigerant loss in handling. There has not been available a means for cleaning an installed system and its refrigerant while they are still in an operating relationship.

It is an object of this invention to provide a new improved process and system for cleaning and rejuvenating an operating refrigeration system. It is another object of this invention to provide an improved process and system involving flushing out the installed system with both liquid and vaporous refrigerant. Still other objects will appear from the more detailed description which follows.

BRIEF SUMMARY OF THE INVENTION

This invention relates to a process for cleaning and flushing an installed refrigeration system, including an installed compressor and a vaporizable liquid refrigerant used in the system; the process comprising:

(a) disconnecting the refrigerant inlet and exit lines which join the installed compressor to the installed refrigerant system;

(b) connecting the inlet and exit lines of the installed refrigeration system to corresponding input and output lines of a portable refrigeration cleaning and flushing system including a portable compressor, a condenser, a receiver, an evaporator, means for cleaning the refrigerant and the same refrigerant as that of the installed system to be rejuvenated;

(c) operating the cleaning refrigeration system to flush the refrigerant through the installed system to the system and the refrigerant passing therebetween;

(d) returning to the installed refrigeration system a suitable amount of the refrigerant for normal operation thereof;

(e) reconnecting the installed compressor into said rejuvenated installed refrigeration system by reconnecting the inlet and exit lines to the installed compressor.

In preferred embodiments the refrigerant is flushed alternately in forward and reverse directions through the installed system, and alternately as a liquid through the entire system and as a hot vapor through the entire system; with the flushing refrigerant continuously passing through a filtering means and a dehydrating means in the portable system. In still other preferred embodiments the flow restricting internal structures of certain devices in the installed refrigeration system, such as thermal expansion valves, solenoid valves, strainers, driers, etc. are removed from the conduits to leave free flowing conduits through the installed refrigeration system.

BRIEF DESCRIPTION OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawing which is a flow sheet.

DETAILED DESCRIPTION OF THE INVENTION

Figure 1:
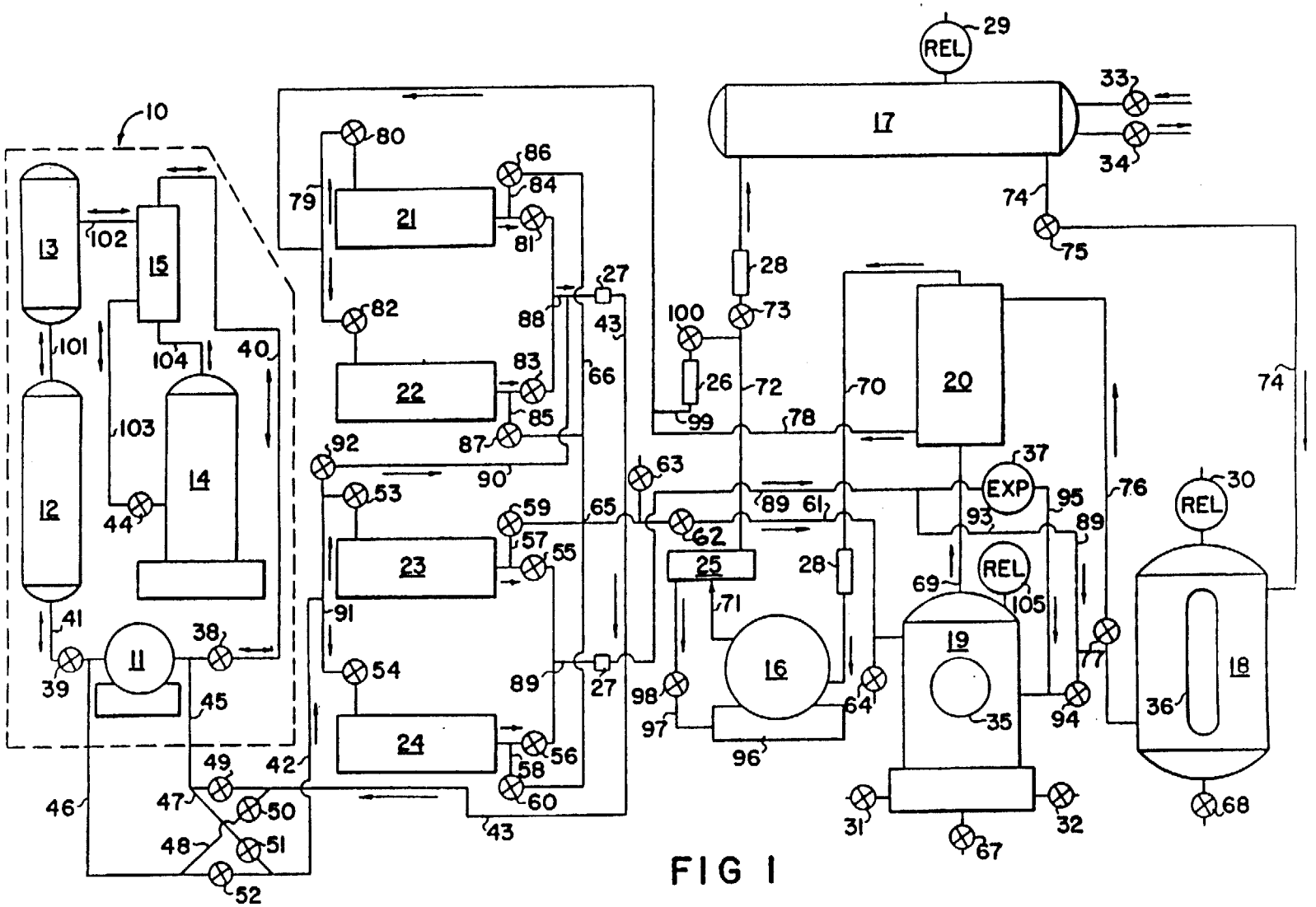

In the attached drawing there is shown a flow sheet which illustrates the process and system of this invention. An installed refrigeration system 10 is shown as one which is to be cleaned and rejuvenated by the system of this invention. All of the installed system 10 is inside the dotted lines and the system of this invention is that outside of the dotted lines.

The installed refrigeration system normally includes a compressor 11 which produces hot high pressure vapor from the refrigerant fed to compressor 11. The most common refrigerant is a Freon, which is a fluorocarbon or a fluorochlorocarbon, both of which being included here in the word "fluorocarbon". Most commonly used refrigerants are Freon 12, Freon 22, or Freon 502. Hot fluorocarbon vapor at a high pressure is passed through line 41 to a condenser 12 which cools the fluorocarbon sufficiently to make it condense to a liquid, which is conducted through line 101 to a receiver 13 which serves as a reservoir of the refrigerant until needed for use in cooling, as in an air conditioner, a food refrigerator, etc. When required, liquid refrigerant passes through line 102 to a heat exchanger 15 where the liquid is cooled and conducted through line 103 and expansion valve 44 to an evaporator 14. In evaporator 14 the liquid refrigerant is changed to a vapor and the heat of vaporization is supplied from the space which is to be cooled, e.g., an air conditioned room, the interior of a refrigerator, etc. By absorbing the heat from the refrigerated space, the refrigerant is vaporized and the space is cooled. The refrigerant vapor leaves evaporator 14 as a cool vapor through line 104 and passes through heat exchanger 15 where it absorbs heat from the liquid passing through heat exchanger 15 from line 102 to line 103 (mentioned above). The warmed vaporous refrigerant leaves heat exchanger 15 through line 40 returning to compressor 11 to complete the cycle of refrigerant flow. There normally are various valves, controls and gauges incorporated in the installed refrigeration system to make it function automatically, but these valves, controls, and gauges are not shown here for reasons of making this description easier to understand. Two valves, 38 and 39, are shown here because they are needed to describe the present invention. These valves 38 in line 40 and 39 in line 41 are at the suction and delivery sides of compressor 11 and are used to isolate compressor 11 from the remainder of the installed system 10 when it is necessary to remove compressor 11 from operation, as is the case in the present invention.

The system of the present invention (everything on the attached drawing except installed refrigeration system 10 inside the dotted lines) is essentially a duplicate refrigeration system to that described above in system 10. The system of the present invention is mobile or portable so it can be transported close to installed system 10 for purposes of cleaning out installed system 10. Generally this means that the system of the present invention, called herein the "cleaning system", is mounted on an automotive trailer with wheels so as to roll it wherever needed.

The cleaning system includes a compressor 16, a condenser 17, a receiver 18, an evaporator 19, and a heat exchanger 20, all of which are connected together and function in the same manner as described above for the same components of installed system 10; namely, compressor 11, condenser 12, receiver 13, evaporator 14, and heat exchanger 15. The refrigerant used in the cleaning system should, if possible, be identical to that used in installed system 10; otherwise the refrigerant in installed system 10 must be removed, stored, and cleaned separately, while the cleaning system flushes out and cleans the installed system 10. The cleaning system includes, in addition to the components mentioned above, one or more dehydrators 21 and 22 and one or more filters 23 and 24. The various conduits, valves, and other minor components will be described below. The entire cleaning system comprises a closed circuit in which the refrigerant goes through the cycle of being a compressed hot vapor that is cooled to a liquid, expanded to a vapor and returned to be compressed again. The cleaning system is designed to cause the refrigerant as a vapor or as a liquid to pass through a dehydrator 21 or 22, and also through a filter 23 or 24.

When the cleaning system is in operation cleaning installed system 10, the two systems must be connected together to form one enlarged closed circuit in which the refrigerant from the installed system will flow and be cleaned and purified while doing so. Of course, when both systems are joined the capacity is sufficiently large that refrigerant from the cleaning system is also needed, and, as a matter of fact, the refrigerants from both sources actually become mixed together during the cleaning process. In order to produce the one enlarged closed circuit, compressor 11 is removed from the installed system circuit, and lines 45 and 46 respectively, are connected to the installed system 10. Compressor 11 is cleaned separately, if required, while it is out of the operating circuit.

The cleaning process provided by this invention involves passing refrigerant, at different times as a liquid or as a vapor, and at different times in the forward direction and in the reverse direction, to flush out all portions and components of the installed system so as to remove contaminants whether they be solid, liquid, or gas. Solid contaminants include particles of dust, dirt, rust, corrosion products, etc. Liquid contaminants include principally water and acidic compounds resulting from chemical reactions. Gaseous contaminants include water vapor, air, nitrogen, oxygen and other noncondensible materials. These various contaminants are flushed out of the installed system and carried along with the flushing refrigerant to be removed from the flushing stream in the dehydrators 21 or 22 and the filters 23 and 24, and elsewhere in the cleaning system. In some instances the flushing refrigerant is a hot vapor and in other instances it is a cool or warm liquid. The flow of the refrigerant through installed system 10 is sometimes in the forward direction, i.e., line 41 to condenser 12 to line 101 to receiver 13 to line 102 to heat exchanger 15 to line 103 to evaporator 14 to line 104 to heat exchanger 15 to line 40 and back to line 41; and sometimes in the reverse direction, i.e., line 40 to heat exchanger 15 to line 104 to evaporator 14 to line 103 to heat exchanger 15 to line 102 to receiver 13 to line 101 to condenser 12 to line 41 and back to line 40. The more turbulent the flow of the flushing refrigerant, the better cleaning of the installed system 10. To assist in this optimum flushing operation, any component which causes a substantial restriction in the flow of the refrigerant through installed system 10 is removed from the circuit and replaced with a nonrestricting length of pipe, or otherwise made less of an obstacle to flow. Generally, this entails merely the removal of the interior mechanism of the component leaving its outer shell to allow the flushing refrigerant to pass through freely. Examples of components having such flow restricting internal structures are thermal expansion valves, strainers, solenoid valves and the like.

The flushing refrigerant passing through the cleaning system will flow through at least one dehydrator, 21 or 22, and at least one filter 23, or 24. As the name implies, dehydrator 21 or 22 is especially designed to remove water, but it also will remove other liquids or vapors which physically or chemically absorbed or chemically reacted by any material used as a decontaminant in the dehydrator. Preferably, dehydrators 21 or 22 are filled with a dessicant and an alkaline material to react with any acidic materials in the refrigerant, such as sulfurous, chlorinated, or nitrated substances. Filters 23 and 24 are specifically relied upon to remove any solid, particulate contaminants, such as dirt, dust, paint, rust, corrosion products, metal, and the like. The dehydrators 21 and 22 as well as the filters 23 and 24 are placed in pairs in parallel flow so as to permit one of each to be in the closed flow circuit of the refrigerant at all times, while the other of the pair is free to be cleaned or to have its interior dehydrating or filtering means replaced. Thus, no interruption of the flushing and cleaning operation need be experienced.

In order to reverse the flow direction of the refrigerant the cleaning system includes a cross-over arrangement of piping and valves shown in the drawing to include lines 45 and 46, conduits 47 and 48, and valves 49, 50, 51 and 52. It may be seen that when the flow direction is forward (as described above) refrigerant in line 43 from the cleaning system will flow through valve 50 into conduit 48, into line 46 and into installed system 10, while returning through line 45 through conduit 47 and valve 51 to line 42. Valves 49 and 52 would be closed for forward flow. When reverse flow is desired, valves 50 and 51 would be closed and valves 49 and 52 would be open. This would direct flow from line 43 through valve 49 to line 45 to flow backward through installed system 10 and to return to the cleaning system through line 46 and valve 52 to line 42. Other arrangements can be devised to quickly and easily reverse the flow direction and this invention is not intended to be restricted solely to that shown and described here.

In the operation of the flushing system described generally above, the following more detailed description may be followed. The first step is to turn off valves 38 and 39, disconnect compressor 11 and connect lines 45 and 46 to the disconnected valves 38 and 39 or to fittings attached to those valves. Preferably there are provided special caps to cover the disconnected nipples leading into and away from compressor 11 so as to close the compressor to any possibility of becoming contaminated by the environment while installed system 10 is being flushed and cleaned.

All flow restricting components, in the installed system 10, such as thermal expansion valves, solenoid valves, strainers, driers, and the like, are, to the extent possible, made to be as free flowing as possible, by removal of interior parts and opening any manual valves wide open.

The cleaning refrigeration system is then operated by starting compressor 16 and setting the necessary valves so that compressed refrigerant vapor flows through line 71 into oil separator 25 which removes any oil contamination that may find its way into the refrigerant. The oil-free vapor passes through line 72, valve 73, vibration dampener 28 and into condenser 17 where it is changed to a liquid. Liquid refrigerant leaving condenser 17 flows through line 74 and valve 75 into receiver 18 where a supply of the liquid refrigerant is stored and is visible through a long vertical sight glass 36. Receiver 18 delivers liquid refrigerant through line 76 and valve 77 to heat exchanger 20 and out through line 78 to pass through several conduits and components before flushing through installed system 10 and returning through line 89, bypass 93, and valve 94 to evaporator 19. Valve 94 is a manually operated expansion valve which reduces the pressure of liquid refrigerant in line 93 and permits it to vaporize in evaporator 19. A sight glass 35 is shown to permit visibility of the material inside evaporator 19. Preferably, there are at least two sight glasses 35, 90° or more apart to provide light inside evaporator 19. Vaporous refrigerant leaves evaporator 19 through line 69 to heat exchanger 20 where the vapor is warmed by absorbing heat from the liquid passing through heat exchanger 20 from line 76 to line 78. The warmed vapor passes through line 70 and vibration dampener 28 into compressor 16 to complete the cycle. Evaporator 19 requires a heat load, i.e., a source of heat to be absorbed into the liquid and vaporous refrigerant in evaporator 19 so as to transform all of it to a vapor leaving in line 69. Normally this source of heat would be found in the space being air conditioned or the refrigerator being cooled by the system. In this instance there may not be such a good source of heat for a mobile system, and so there is shown an artificial heat source entering a line through valve 31 and leaving through a line passing through valve 32. For example, a steam line might be available in the structure where installed system 10 is located. This invention is particularly adaptable for use in cleaning a large refrigeration system on a ship and there always is steam available on such a ship. In other locations, such as an office building the heat source could be hot water from the heating system of the building, or steam from any boiler or from a steam jenny. Drain valve 67 is shown for evaporator 19. Drain valve 68 is shown for receiver 18. An alternate entrance to evaporator 18 is shown by line 89 passing through thermal expansion valve 37 and then through line 95 into evaporator 19.

With the basic circuit of the cleaning system in operation as described above, it only remains to conduct liquid refrigerant from line 78 to line 43 leading to installed system 10 and to return that refrigerant through line 42 to evaporator 19. The normal circuit for liquid refrigerant in line 78 is to continue to split line 79 leading to either of dehydrators 21 or 22 through valves 80 or 82 respectively. The refrigerant leaves dehydrators 21 or 22 through valves 81 or 83, respectively, to line 88 through a sight glass device 27 (where the flow of liquid can be confirmed) to line 43 and thence into installed system 10. The return from installed system 10 passes through line 42 to split line 91 leading to either of filters 23 or 24 through valves 53 or 54, respectively. Refrigerant leaves filters 23 or 24 through valves 55 or 56, respectively, to common line 89, through a sight glass device 27 (identical to that described above) to line 89 and thence to evaporator 19. For purposes of pumping out and cleaning the system of this invention, lines 84, 85, 57, and 58, along with corresponding valves 86, 87, 55 and 56 are provided to connect into common line 66, which crosses and is joined to line 61 permitting this exit from dehydrators 21 and 22 and filters 23 and 24 to be conducted, if desired, to evaporator 19. Valve 62 in line 61 normally, however, is closed. When pumping out through line 66 to clean the basic system, exit line and valve 63 may be open and connected to an enclosed container (not shown). A by-pass line 90 and valve 92 is provided for short circuiting the refrigerant from line 42 back to line 43 when desired during certain changeover operations.

When refrigerant as a hot vapor is to be employed for flushing out installed system 10, the compressed vapor in line 72 from compressor 16 is sent directly to line 78 and dehydrators 21 or 22 and to the installed system through bypass line 99 passing through valve 100 and strainer 26. In this instance valve 73 is closed. The hot vapor passes through dehydrators 21 or 22 and installed system 10 and back to evaporator 19 as described previously. The hot vapor route merely cuts condenser 17, receiver 18, and heat exchanger 20 out of the circuit temporarily.

The other components of the cleaning system are well known in other refrigeration systems. Condenser 17 is cooled by inlet coolant passing through valve 33 to the interior (normally a shell-and-tube structure) to perform its cooling effect, and then exits through valve 34. Normally, the coolant would be water, e.g., sea water if the system is used on a ship. Pressure relief valve 29 is provided to handle any unexpected pressure increases on the vaporous refrigerant entering the condenser 17 from compressor 16. Similarly, a pressure relief valve 30 and pressure valve 105 on evaporator 19 are provided to handle any unexpectedly high pressures therein. Valve 64 and the line connected thereto is provided for the introduction of refrigerant into the cleaning system, should it be needed. Base 96 of compressor 16 is connected to oil separator 25 through line 97 and valve 98 to return lubricating oil from separator 25 to compressor 16 and crankshafts connecting a motor (not shown) to compressor 16. There also will be normally used in the cleaning system of this invention various pressure gauges, flow meters, temperature and pressure controls, and the like, needed or desired to make the refrigeration system easy to monitor and control, but for the sake of clarity and freedom from confusion, such items are not shown, because they are commercial items routinely used on refrigeration systems, and subject to the desires of individual operators.

When all the necessary cleaning has been accomplished in the judgment of the operator, compressor 11 is reconnected into the installed system 10, all of the flow restricting devices are reassembled to original operational arrangement and sufficient cleaned refrigerant is returned to receiver 13 to permit the installed system 10 to operate separately and independently as a rejuvenated system.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A process for cleaning and flushing an installed refrigeration system, including an installed compressor and a vaporizable liquid refrigerant used in the system; the process comprising:

(a) disconnecting the refrigerant inlet and exit lines which join the installed compressor to the installed refrigeration system;

(b) connecting the inlet and exit lines of the installed refrigeration system to corresponding input and output lines of a portable refrigeration cleaning and flushing system including a portable compressor, a condenser, a receiver, an evaporator the same refrigerant as that of the installed system to be rejuvenated; and means for cleaning said refrigerant;

(c) operating said portable refrigeration system to flush said refrigerant through the combined installed system and *at least said evaporator and said compressor of said* portable system to clean said installed system and the refrigerant passing therebetween;

(d) returning to said installed refrigeration system a suitable amount of cleaned refrigerant for normal operation thereof;

(e) reconnecting the installed compressor into said rejuvenated installed refrigeration system by reconnecting the inlet and exit lines of the installed compressor to said installed refrigeration system.

2. The process of claim 1 further comprising:

(f) prior to step (c) removing the portions of any components of the installed system which interfere with free flow of refrigerant.

3. The process of claim 1 wherein said refrigerant in step (c) is a hot gas.

4. The process of claim 1 wherein said refrigerant in step (c) is a liquid.

5. The process of claim 1 wherein step (c) includes:

(g) filtering the refrigerant primarily of solid contaminants, and (h) dehydrating the refrigerant primarily of aqueous contaminants.

6. The process of claim 5 wherein said portable refrigeration system includes two filter means connected in parallel flow and two dehydrator means connected in parallel flow, and steps (g) and (h) include passing the refrigerant through either of the filter means and either of the dehydration means while the other filter means or dehydrating means is cleaned without interruption of step (c).

7. The process of claim 1 wherein step (a) includes:

(i) heating the evaporator to cause evaporation of the refrigerant to a vapor.

8. The process of claim 3 further including:

(j) bypassing the condenser and receiver of the cleaning and flushing system when the hot gas refrigerant is passed through the installed system.

9. The process of claim 1 wherein step (c) is repeated a plurality of cycles with some of the cycles utilizing the refrigerant as a hot gas and others of the cycles utilizing the refrigerant as a liquid.

10. The process of claim 1 wherein step (c) is repeated a plurality of cycles with some of the cycles flushing the installed refrigeration system in the normal operating direction of refrigerant flow and others of the cycles flushing the installed refrigeration system in the direction of flow opposite to the normal operating direction.

11. The process of claim 9 wherein a portion of the cycles are operated in the normal direction of refrigerant flow through the installed system and another portion of the cycles are operated in the direction opposite to the normal operating direction.

12. The process of claim 1 wherein step (a) includes:

(k) removing from components of the installed refrigeration system internal mechanisms that restrict the flow of refrigerant therethrough.

13. A process for cleaning and flushing an installed refrigeration system including an installed compressor and a vaporizable liquid refrigerant used in the system; the process comprising:

(a) disconnecting the refrigerant inlet and exit lines which join the installed compressor to the installed refrigeration system;

(b) connecting the inlet and exit lines of the installed refrigeration system to corresponding input and output lines of a portable refrigeration cleaning and flushing system including a portable compressor, a condenser, a receiver, an evaporator, the same refrigerant as that of the system to be rejuvenated and means for cleaning the refrigerant;

(c) operating the cleaning refrigeration system to flush the refrigerant as a hot gas through the installed system to clean the system and the refrigerant passing therebetween;

(d) operating the portable refrigeration system to flush the refrigerant as a liquid through the installed system to clean the system and the refrigerant passing therebetween;

(e) returning to the installed refrigeration system a suitable amount of the cleaned refrigerant for normal operation thereof; and (f) reconnecting the installed compressor into the rejuvenated installed refrigeration system by reconnecting the inlet and exit lines to the installed compressor.

14. The process of claim 13 further comprising:

(g) prior to step (c) removing portions of any components of the installed system which interfere with the free flow of refrigerant.

15. The process of claim 14 wherein the refrigerant is a fluorocarbon and step (b) is carried out at a vapor temperature of 100°-180° F.

16. The process of claim 13 wherein steps (b) and (c) are each repeated at least once in an alternating procedure in which step (c) follows step (b) and step (b) follows step (c).

17. The process of claim 13 wherein the flow direction of flushing refrigerant in step (b) or (c) is from time to time reversed so as to provide flow of the refrigerant through said installed refrigeration system in the normal operating direction and in the direction reverse to normal.

18. The process of claim 13 wherein the cleaning refrigeration system includes:

(h) filtering solid particles from the refrigerant; and (i) removing aqueous contaminants from the refrigerant by dehydrating means.

19. A process for cleaning and flushing an installed commercial refrigeration system including a fluorocarbon refrigerant, a compressor, a condenser, an evaporator, a receiver, and suitable valves, gauges, conduits, and other components of such a system; said process comprising:

(a) disconnecting the conduits carrying refrigerant to and from said compressor of the installed system, (b) connecting the disconnected conduits to a portable cleaning and flushing refrigeration system including the identical refrigerant to that of the installed system, a compressor, a condenser, an evaporator, a receiver, a filtering means, and a dehydrating means to form a closed circuit that includes the installed refrigeration system with its compressor excluded and said portable refrigeration system;

(c) removing from the installed refrigeration system the internal flow restricting parts of any component thereof which can readily be so removed;

(d) operating said portable refrigeration system to flush refrigerant in the form of a hot vapor through the installed system in the normal operating direction of flow and through the filtering means and said dehydrating means of said portable system;

(e) operating said portable refrigeration system to flush refrigerant in the form of a liquid through the installed system in the normal operating direction of flow and through the filtering means and the dehydrating means of said portable system;

(f) operating said portable refrigeration system to flush refrigerant in the form of a hot vapor through the installed system in the direction of flow reverse to that of step (d) and through the filtering means and dehydrating means of said portable system;

(g) operating said portable refrigeration system to flush refrigerant in the form of a liquid through the installed system in the direction of flow reverse to that of step (e) and through the filtering means and the dehydrating means of said portable system;

(h) returning to the installed system a suitable amount of the refrigerant employed in steps (d), (e), (f) and (g) to operate the installed system; and (i) reconnecting the installed compressor into the installed system by reconnecting the conduits disconnected in step (a), and reassembling the flow-restricting parts removed in step (c).

20. The process of claim 19 wherein hot vapor is at a temperature of 100°-180° F.

21. The process of claim 19 wherein the evaporator of said portable system is supplied with an independent source of heat to cause said portable system to operate under a heat load.

22. The process of claim 19 which additionally includes, following step (g) a repeat of one or more of steps (d), (e), (f) or (g).

23. The process of claim 19 wherein the filtering means of step (a) includes at least two filtering means connected in parallel flow so that one may be included operationally in steps (c), (d), (e) and (f) while the other is being cleaned or replaced.

24. The process of claim 19 wherein the dehydrating means of step (a) includes at least two dehydrating means connected in parallel flow so that one may be included operationally in steps (c), (d), (e) and (f) while the other is being cleaned or replaced.

25. In a system for cleaning and flushing an installed refrigeration system including in a closed circuit a compressor, a condenser, a receiver, an evaporator, a vaporizable refrigerant and associated control apparatus;

(a) an operable portable refrigeration cleaning and flushing system including a compressor, a condenser, a receiver, an evaporator, the same refrigerant as employed in the installed system, suitable associated conduits and control apparatus, a filtering means, and a dehydrating means;

(b) means for disconnecting the compressor from the installed refrigeration system and connecting the operable portable refrigeration system in place of said compressor to maintain a closed circuit;

(c) means for removing from the conduits and control apparatus of the installed system mechanism restricting the refrigerant flow therethrough while maintaining a closed circuit;

(d) means for flushing through the installed system closed circuit refrigerant in the form of a liquid or a hot vapor propelled by the portable refrigeration system.

(e) means for optionally causing the flow of flushing refrigerant to be in the normal operating direction of flow through the installed system or in the reverse direction;

(f) means to cause the flow of flushing refrigerant to pass through said filtering means and/or said dehydrating means in both directions of flow specified in (e); and (g) means to apply heat to the evaporator of the portable refrigeration system to provide a suitable heat load thereon to cause the portable refrigeration system to operate a normal refrigeration cycle.

26. The system of claim 25 which additionally includes:

(h) means to remove the condenser and the receiver of the portable refrigeration system from the closed circuit when employing the refrigerant in the form of a hot vapor for flushing operation.

27. The system of claim 25 wherein the filtering means and the dehydrating means of (a) includes two filters connected in parallel flow to remove particulate matter from the flushing refrigerant, and two dehydrators connected in parallel flow to remove aqueous contaminants from the flushing refrigerant.

28. The system of claim 27 which additionally comprises:

(i) means to disconnect one of either filter or one of either dehydrator from the closed circuit for purposes of cleaning or servicing the disconnected apparatus.

*29. The process of claim 1, wherein said refrigerant is flushed through said evaporator, said compressor, and said condenser of said portable system.*

*30. The process of claim 1, wherein said refrigerant is flushed through said evaporator, said compressor, and said receiver of said portable system.*

*31. The process of claim 1, wherein said refrigerant is flushed through said evaporator, said compressor, said condenser, and said receiver of said portable system.*

* * * * *